US012247154B2

(12) United States Patent
Schmidt

(10) Patent No.: US 12,247,154 B2
(45) Date of Patent: Mar. 11, 2025

(54) USE OF 2,3,3,3-TETRAFLUOROPROPENE FOR HEATING A LITHIUM BATTERY

(71) Applicant: Arkema France, Colombes (FR)

(72) Inventor: Gregory Schmidt, Pierre-Benite (FR)

(73) Assignee: Arkema France, Colombes (FR)

( * ) Notice: Subject to any disclaimer, the term of this patent is extended or adjusted under 35 U.S.C. 154(b) by 553 days.

(21) Appl. No.: 17/597,250

(22) PCT Filed: Jun. 3, 2020

(86) PCT No.: PCT/FR2020/050946
§ 371 (c)(1),
(2) Date: Dec. 30, 2021

(87) PCT Pub. No.: WO2021/005277
PCT Pub. Date: Jan. 14, 2021

(65) Prior Publication Data
US 2022/0315821 A1  Oct. 6, 2022

(30) Foreign Application Priority Data
Jul. 5, 2019  (FR) ....................................... 1907557

(51) Int. Cl.
| H01M 10/613 | (2014.01) |
| C09K 5/04 | (2006.01) |
| H01M 4/38 | (2006.01) |
| H01M 10/0568 | (2010.01) |
| H01M 10/0569 | (2010.01) |
| H01M 10/625 | (2014.01) |
| H01M 10/6564 | (2014.01) |
| H01M 10/6571 | (2014.01) |
| H01M 10/663 | (2014.01) |
| H01M 4/02 | (2006.01) |

(52) U.S. Cl.
CPC ............ *C09K 5/045* (2013.01); *H01M 4/382* (2013.01); *H01M 10/0568* (2013.01); *H01M 10/0569* (2013.01); *H01M 10/613* (2015.04); *H01M 10/625* (2015.04); *H01M 10/6564* (2015.04); *H01M 10/6571* (2015.04); *H01M 10/663* (2015.04); *C09K 2205/126* (2013.01); *H01M 2004/027* (2013.01); *H01M 2220/20* (2013.01); *H01M 2300/0028* (2013.01)

(58) Field of Classification Search
CPC ............ C09K 5/045; C09K 2205/126; H01M 10/613; H01M 10/625; H01M 10/6564; H01M 10/6571; H01M 10/663; H01M 4/382; H01M 10/0568; H01M 10/0569; H01M 2004/027; H01M 2220/20; H01M 2300/0028
See application file for complete search history.

(56) References Cited

U.S. PATENT DOCUMENTS

| 5,305,613 A | 4/1994 | Hotta et al. | |
| 2010/0304270 A1* | 12/2010 | Amin-Sanayei | .... H01M 10/052 361/528 |
| 2011/0139397 A1 | 6/2011 | Haussmann | |
| 2011/0240254 A1 | 10/2011 | Rached | |
| 2014/0039735 A1 | 2/2014 | Major et al. | |
| 2015/0147662 A1* | 5/2015 | Park | .................. H01M 10/0568 429/188 |
| 2015/0191072 A1* | 7/2015 | Inoue | ...................... B60L 15/20 62/428 |
| 2017/0080773 A1* | 3/2017 | Rached | .................. C09K 5/045 |
| 2018/0004798 A1 | 2/2018 | Stabler et al. | |
| 2018/0241102 A1* | 8/2018 | Kim | .................. H01M 10/6568 |
| 2019/0363411 A1 | 11/2019 | Takeuchi et al. | |

FOREIGN PATENT DOCUMENTS

| EP | 2880739 A2 | 6/2015 |
| FR | 2937906 A1 | 5/2010 |
| JP | 2012-507682 A | 3/2012 |
| JP | 2012-528466 A | 11/2012 |
| JP | 2014-525497 A | 9/2014 |
| JP | 2016-139512 A | 8/2016 |
| JP | 2018-533167 A | 11/2018 |
| JP | 2019-016584 A | 1/2019 |
| WO | 2013032768 A1 | 3/2013 |
| WO | 2018142090 A1 | 8/2018 |

OTHER PUBLICATIONS

The Notification of French Patent Office to grant a Patent for Application N° FR1907557 (Year: 2023).*
Office Action (Notice of Reasons for Refusal) issued on Oct. 23, 2023, by the Japanese Patent Office in corresponding Japanese Patent Application No. 2022-500012, and an English Translation of the Office Action. (9 pages).
U.S. Appl. No. 17/624,194, filed Dec. 30, 2021, Gregory Schmidt. Schmidt, Gregory, U.S. Appl. No. 17/624,194 entitled "Use Of 2,3,3,3-Tetrafluoropropene for Cooling a Battery Having an Oxide-Type Positive Electrode," filed in the U.S. Patent and Trademark Office on Dec. 30, 2021.
Arcus, "Exciting Developments In NMC 811 Lithium Battery Technology" CleanTechnica, Mar. 4, 2018. Retrieved from the Internet on Apr. 20, 2020, https://cleantechnica.com/2018/03/04/exciting-developments-nmc-811-lithium-battery-technology/ XP055687561.
Berhaut et al., "LiTDI and LiFSI as substitutes for LiPF 6 in Li-ion batteries electrolytes" 11E Seminaire Japon-France Sur Les Baiteries, Sep. 1, XP055687816.
International Search Report (PCT/ISA/210) with translation and Written Opinion (PCT/ISA/237) mailed on Sep. 14, 2020, by the European Patent Office as the International Searching Authority for International Application No. PCT/FR2020/050945.
(Continued)

*Primary Examiner* — Alexander Usyatinsky
(74) *Attorney, Agent, or Firm* — Buchanan Ingersoll & Rooney PC

(57) ABSTRACT

The use of a refrigerant including 2,3,3,3-tetrafluoropropene for the heating of a battery of an electric vehicle including at least one electrochemical cell including a negative electrode, a positive electrode and an electrolyte, the electrolyte including a lithium salt and the negative electrode including metallic lithium as electrochemically active material.

11 Claims, No Drawings

(56) References Cited

OTHER PUBLICATIONS

International Search Report (PCT/ISA/210) with translation and Written Opinion (PCT/ISA/237) mailed on Sep. 14, 2020, by the European Patent Office as the International Searching Authority for International Application No. PCT/FR2020/050946.

Office Action issued by the U.S. Patent and Trademark Office in the U.S. Patent Application No. 17/624,194, mailed Sep. 16, 2024, U.S. Patent and Trademark Office, Alexandria, VA. (23 pages).

\* cited by examiner

USE OF 2,3,3,3-TETRAFLUOROPROPENE FOR HEATING A LITHIUM BATTERY

FIELD OF THE INVENTION

The present invention relates to the use of 2,3,3,3-tetrafluoropropene for the heating of a lithium battery, that is to say a battery comprising a lithium salt as electrolyte.

TECHNICAL BACKGROUND

In vehicles, it is known to use a vapor compression circuit to provide heating or cooling. A refrigerant circulates in this circuit and thus undergoes evaporation, followed by compression, condensation and expansion to complete the cycle.

2,3,3,3-Tetrafluoropropene (HFO-1234yf) is a hydrofluoroolefin exhibiting thermodynamic and thermophysical properties which are very favorable for use as refrigerant, in particular in cooling, air conditioning, electricity production (in particular by means of Rankine cycles) and heat pump applications. In addition, this product is particularly advantageous since it also exhibits a low global warming potential (GWP).

Electric vehicles comprise a battery comprising electrochemical cells. Each electrochemical cell comprises a negative electrode, a positive electrode, a separator and an electrolyte. According to the nature of the materials present in the cells, the operation of the battery can be more or less affected, indeed even the battery can be more or less degraded, depending on the temperature.

The document FR 2 937 906 describes a process for heating and/or air conditioning a motor vehicle passenger compartment using a reversible refrigerating loop in which a refrigerant comprising 2,3,3,3-tetrafluoropropene circulates. This process is also suitable for hybrid vehicles designed to operate alternately on a heat engine and an electric motor.

The document EP 2 880 739 discloses a system for charging an electric vehicle battery which at the same time makes it possible to control the temperature of the battery of the vehicle as well as the temperature of the passenger compartment.

The document U.S. Pat. No. 5,305,613 describes a system for heating and air conditioning a passenger compartment of an electric vehicle which is operated before starting the vehicle in order to increase the comfort of the driver.

The document US 2015/0191072 describes a refrigeration cycle making it possible to perform heating or air conditioning functions, and in particular making it possible to heat air blown over a battery.

The document US 2011/0139397 describes a process for controlling the temperature of the compartment of an electric vehicle, by means of a refrigerant circuit. The refrigerant circuit is in particular coupled with the battery.

There exists a need to provide for ensuring optimal operation of the batteries of electric vehicles and for preventing their degradation.

SUMMARY OF THE INVENTION

The invention relates firstly to the use of a refrigerant comprising 2,3,3,3-tetrafluoropropene for the heating of a battery of an electric vehicle comprising at least one electrochemical cell comprising a negative electrode, a positive electrode and an electrolyte, the electrolyte comprising a lithium salt and the negative electrode comprising metallic lithium as electrochemically active material.

In some embodiments, the lithium salt of the electrolyte is chosen from $LiPF_6$, LiFSI, LiTDI, $LiPOF_2$, $LiB(C_2O_4)_2$, $LiF_2B(C_2O_4)_2$, $LiBF_4$, $LiNO_3$, $LiClO_4$ and the mixtures of these.

In some embodiments, the battery is maintained at a temperature of between a minimum temperature $t_1$ and a maximum temperature $t_2$.

In some embodiments, the minimum temperature $t_1$ is greater than or equal to 10° C. and the maximum temperature $t_2$ is less than or equal to 40° C., preferably the minimum temperature $t_1$ is greater than or equal to 15° C. and the maximum temperature $t_2$ is less than or equal to 30° C., and more preferably the minimum temperature $t_1$ is greater than or equal to 16° C. and the maximum temperature $t_2$ is less than or equal to 28° C.

In some embodiments, the refrigerant circulates in a vapor compression circuit.

In some embodiments, the vapor compression circuit is also suitable for heating the passenger compartment of the vehicle and/or for air conditioning the passenger compartment of the vehicle and/or for cooling the battery of the vehicle.

In some embodiments, the refrigerant consists essentially of 2,3,3,3-tetrafluoropropene.

In some embodiments, the refrigerant comprises approximately 78.5% by weight of 2,3,3,3-tetrafluoropropene and approximately 21.5% by weight of difluoromethane.

The invention also relates to a process for conditioning the battery of an electric vehicle, said battery comprising at least one electrochemical cell comprising a negative electrode, a positive electrode and an electrolyte, the electrolyte comprising a lithium salt and the negative electrode comprising graphite or a lithium-containing material as electrochemically active material, the process comprising:
the heating of the battery with a refrigerant comprising 2,3,3,3-tetrafluoropropene.

In some embodiments, the lithium salt of the electrolyte is chosen from $LiPF_6$, LiFSI, LiTDI, $LiPOF_2$, $LiB(C_2O_4)_2$, $LiF_2B(C_2O_4)_2$, $LiBF_4$, $LiNO_3$, $LiClO_4$ and the mixtures of these.

In some embodiments, the process comprises:
maintaining the battery of the vehicle at a temperature of between a minimum temperature $t_1$ and a maximum temperature $t_2$.

In some embodiments, the minimum temperature $t_1$ is greater than or equal to 10° C. and the maximum temperature $t_2$ is less than or equal to 40° C., preferably the minimum temperature $t_1$ is greater than or equal to 15° C. and the maximum temperature $t_2$ is less than or equal to 30° C., and more preferably the minimum temperature $t_1$ is greater than or equal to 16° C. and the maximum temperature $t_2$ is less than or equal to 28° C.

In some embodiments, maintaining the battery of the vehicle at a temperature of between $t_1$ and $t_2$ is carried out alternately by cooling the battery with the refrigerant and by heating the battery.

In some embodiments, the heating of the battery is also carried out partially by an electrical resistance.

In some embodiments, the refrigerant circulates in a vapor compression circuit.

In some embodiments, the refrigerant consists essentially of 2,3,3,3-tetrafluoropropene.

In some embodiments, the refrigerant comprises approximately 78.5% by weight of 2,3,3,3-tetrafluoropropene and approximately 21.5% by weight of difluoromethane.

The present invention makes it possible to meet the need expressed above. This is because it makes it possible to ensure optimal operation of the batteries of electric vehicles and to prevent their degradation, and more particularly of batteries, the electrochemical cells of which comprise an electrolyte based on lithium salt and a negative electrode comprising graphite or a material containing metallic lithium as electrochemically active material. This material exhibits the advantage of conferring a greater energy density than conventional materials of negative electrodes. This is because metallic lithium has a capacity of approximately 3860 mAh/g.

It has been observed that, in such cells, at relatively low temperature, metallic lithium is liable to be deposited on the graphite of the negative electrode, or to form dendrites depending on the material. This phenomenon is liable to cause short circuits and to result in irreversible damage to the battery, and even cause a fire, indeed even an explosion.

It has been found that the use of 2,3,3,3-tetrafluoropropene in a refrigerant, for the heating of such a battery, is particularly effective in preserving the functioning and the integrity of this battery.

DESCRIPTION OF EMBODIMENTS OF THE INVENTION

The invention is now described in greater detail and in a nonlimiting way in the description which follows.

Battery of the Electric Vehicle

The term (optionally "hybrid") "electric vehicle" is understood to mean a motorized device capable of moving or transporting people or materials, the motor of which is supplied with electrical energy by a motor battery (preferably in all, but possibly in part only in the case of a hybrid electric vehicle). The motor battery is called more simply "battery" in the context of the present patent application.

The electric vehicle is preferably an electric automobile. Alternatively, it can be an electric truck or an electric bus.

The battery comprises at least one electrochemical cell, and preferably a plurality. Each electrochemical cell comprises a negative electrode, a positive electrode and an electrolyte interposed between the negative electrode and the positive electrode.

Each electrochemical cell can also comprise a separator, in which the electrolyte is impregnated.

The electrochemical cells can be assembled in series and/or in parallel in the battery.

The term "negative electrode" is understood to mean the electrode which acts as anode when the battery delivers current (that is to say, when it is in the process of discharging) and which acts as cathode when the battery is in the process of charging.

The negative electrode typically comprises an electrochemically active material, optionally an electronically conductive material, and optionally a binder.

The term "positive electrode" is understood to mean the electrode which acts as cathode when the battery delivers current (that is to say, when it is in the process of discharging) and which acts as anode when the battery is in the process of charging.

The positive electrode typically comprises an electrochemically active material, optionally an electronically conductive material, and optionally a binder.

The term "electrochemically active material" is understood to mean a material capable of reversibly inserting ions.

The term "electronically conductive material" is understood to mean a material capable of conducting electrons.

The negative electrode of the electrochemical cell can in particular comprise, as electrochemically active material, metallic lithium. This metallic lithium can be in essentially pure form or in the form of an alloy. Mention may be made, for example, among the lithium-based alloys capable of being used, of lithium-aluminum alloys, lithium-silica alloys, lithium-tin alloys, Li—Zn, $Li_3Bi$, $Li_3Cd$ and $Li_3SB$. Mixtures of the above materials can also be employed.

The negative electrode can be in the form of a film or a rod. An example of negative electrode can comprise an active lithium film prepared by rolling a strip of lithium between rollers.

The positive electrode comprises an electrochemically active material, preferably of oxide type, and preferably chosen from manganese dioxide ($MnO_2$), iron oxide, copper oxide, nickel oxide, lithium/manganese composite oxides (for example $Li_xMn_2O_4$ or $Li_xMnO_2$), lithium/nickel composite oxides (for example $Li_xNiO_2$), lithium/cobalt composite oxides (for example $Li_xCoO_2$), lithium/nickel/cobalt composite oxides (for example $LiNi_{1-y}Co_yO_2$), lithium/nickel/cobalt/manganese composite oxides (for example $LiNi_xMn_yCo_zO_2$ with x+y+z=1), lithium-enriched lithium/nickel/cobalt/manganese composite oxides (for example $Li_{1+x}(Ni_xMn_yCo_z)_{1-x}O_2$), lithium/transition metal composite oxides, lithium/manganese/nickel composite oxides of spinel structure (for example $Li_xMn_{2-y}Ni_yO_4$), vanadium oxides and their mixtures.

Preferably, the positive electrode comprises an electrochemically active material which is a lithium/nickel/manganese/cobalt composite oxide having a high nickel content ($LiNi_xMn_yCo_zO_2$ with x+y+z=1, abbreviated to NMC, with x>y and x>z), or a lithium/nickel/cobalt/aluminum composite oxide having a high nickel content ($LiNi_{x'}Co_{y'}Al_{z'}$ with x'+y'+z'=1, abbreviated to NCA, with x'>y' and x'>z').

Specific examples of these oxides are NMC532 ($LiNi_{0.5}Mn_{0.3}Co_{0.2}O_2$), NMC622 ($LiNi_{0.6}Mn_{0.2}Co_{0.2}O_2$) and NMC811 ($LiNi_{0.8}Mn_{0.1}Co_{0.1}O_2$).

The material of each electrode can also comprise, besides the electrochemically active material, an electron-conducting material, such as a carbon source, including, for example, carbon black, Ketjen® carbon, Shawinigan carbon, graphite, graphene, carbon nanotubes, carbon fibers (for example, vapor-grown carbon fibers or VGCF), non-powdery carbon obtained by carbonization of an organic precursor, or a combination of two or more of these. Other additives can also be present in the material of the positive electrode, such as lithium salts or inorganic particles of ceramic or glass type, or also other compatible active materials (for example sulfur).

The material of each electrode can also comprise a binder. Nonlimiting examples of binders comprise linear, branched and/or crosslinked polyether polymer binders (for example polymers based on poly(ethylene oxide) (PEO), or poly(propylene oxide) (PPO) or on a mixture of the two (or an EO/PO copolymer), and optionally comprising crosslinkable units), water-soluble binders (such as SBR (styrene/butadiene rubber), NBR (acrylonitrile/butadiene rubber), HNBR (hydrogenated NBR), CHR (epichlorohydrin rubber), ACM (acrylate rubber)), or binders of fluoropolymer type (such as PVDF (polyvinylidene fluoride), PTFE (polytetrafluoroethylene)), and their combinations. Some binders, such as those which are soluble in water, can also comprise an additive, such as CMC (carboxymethylcellulose).

The separator can be a porous polymer film. By way of nonlimiting example, the separator can consist of a porous film of polyolefin, such as ethylene homopolymers, propylene homopolymers, ethylene/butene copolymers, ethylene/hexene copolymers, ethylene/methacrylate copolymers or multilayer structures of the above polymers.

The electrolyte can consist of one or more lithium salts dissolved in a solvent or a mixture of solvents with one or more additives.

By way of nonlimiting examples, the lithium salt or the lithium salts can be chosen from $LiPF_6$ (lithium hexafluorophosphate), LiFSI (lithium bis(fluorosulfonyl)imide), LiTDI (lithium 2-trifluoromethyl-4,5-dicyanoimidazolate), $LiPOF_2$, $LiB(C_2O_4)_2$, $LiF_2B(C_2O_4)_2$, $LiBF_4$, $LiNO_3$ or $LiClO_4$.

The solvent(s) can be chosen from the following nonexhaustive list: ethers, esters, ketones, alcohols, nitriles and carbonates.

Mention may be made, among the ethers, of linear or cyclic ethers, such as, for example, dimethoxyethane (DME), methyl ethers of oligoethylene glycols of 2 to 5 oxyethylene units, dioxolane, dioxane, dibutyl ether, tetrahydrofuran and their mixtures.

Mention may be made, among the esters, of phosphoric acid esters or sulfite esters. Mention may be made, for example, of methyl formate, methyl acetate, methyl propionate, ethyl acetate, butyl acetate, γ-butyrolactone or their mixtures.

Mention may in particular be made, among the ketones, of cyclohexanone.

Mention may be made, among the alcohols, for example, of ethyl alcohol or isopropyl alcohol.

Mention may be made, among the nitriles, for example, of acetonitrile, pyruvonitrile, propionitrile, methoxypropionitrile, dimethylaminopropionitrile, butyronitrile, isobutyronitrile, valeronitrile, pivalonitrile, isovaleronitrile, glutaronitrile, methoxyglutaronitrile, 2-methylglutaronitrile, 3-methylglutaronitrile, adiponitrile, malononitrile and their mixtures.

Mention may be made, among the carbonates, for example, of cyclic carbonates, such as, for example, ethylene carbonate (EC) (CAS: 96-49-1), propylene carbonate (PC) (CAS: 108-32-7), butylene carbonate (BC) (CAS: 4437-85-8), dimethyl carbonate (DMC) (CAS: 616-38-6), diethyl carbonate (DEC) (CAS: 105-58-8), ethyl methyl carbonate (EMC) (CAS: 623-53-0), diphenyl carbonate (CAS 102-09-0), methyl phenyl carbonate (CAS: 13509-27-8), dipropyl carbonate (DPC) (CAS: 623-96-1), methyl propyl carbonate (MPC) (CAS: 1333-41-1), ethyl propyl carbonate (EPC) (CAS: 872-36-6), vinylene carbonate (VC) (CAS: 872-36-6), fluoroethylene carbonate (FEC) (CAS: 114435-02-8), trifluoropropylene carbonate (CAS: 167951-80-6) or their mixtures.

The additive(s) can be chosen from the group consisting of fluoroethylene carbonate (FEC), vinylene carbonate, 4-vinyl-1,3-dioxolan-2-one, pyridazine, vinylpyridazine, quinoline, vinylquinoline, butadiene, sebaconitrile, alkyl disulfides, fluorotoluene, 1,4-dimethoxytetrafluorotoluene, t-butylphenol, di(t-butyl)phenol, tris(pentafluorophenyl)borane, oximes, aliphatic epoxides, halogenated biphenyls, methacrylic acids, allyl ethyl carbonate, vinyl acetate, divinyl adipate, propane sultone, acrylonitrile, 2-vinylpyridine, maleic anhydride, methyl cinnamate, phosphonates, silane compounds containing a vinyl, and 2-cyanofuran.

Refrigerant

In the context of the invention, "HFO-1234yf" refers to 2,3,3,3-tetrafluoropropene.

The term "refrigerant" is understood to mean a fluid capable of absorbing heat by evaporating at low temperature and low pressure and of releasing heat by condensing at high temperature and high pressure, in a vapor compression circuit, according to the application under consideration.

Generally, a refrigerant can consist essentially of a single compound or be a mixture of several compounds.

The invention uses a refrigerant comprising HFO-1234yf. Other heat-transfer compounds may or may not be present in the refrigerant in combination with HFO-1234yf.

The refrigerant can be combined with lubricants and/or additives, in order to form a heat-transfer composition.

The heat-transfer composition is present and circulates in the vapor compression circuit.

In certain embodiments, the refrigerant of the invention consists essentially, indeed even consists, of HFO-1234yf.

In other embodiments, this refrigerant comprises HFO-1234yf as a mixture with one or more other heat-transfer compounds, such as hydrofluorocarbons and/or hydrofluoroolefins and/or hydrocarbons and/or hydrochlorofluoroolefins and/or $CO_2$.

Mention may in particular be made, among hydrofluorocarbons, of difluoromethane (HFC-32), pentafluoroethane (HFC-125), 1,1,2,2-tetrafluoroethane (HFC-134), 1,1,1,2-tetrafluoroethane (HFC-134a), 1,1-difluoroethane (HFC-152a), fluoroethane (HFC-161), 1,1,1,2,3,3,3-heptafluoropropane (HFC-227ea), 1,1,1-trifluoropropane (HFC-263fb) and their mixtures.

Mention may in particular be made, among hydrofluoroolefins, of 1,3,3,3-tetrafluoropropene (HFO-1234ze), in cis and/ortrans form, and preferably in trans form; and trifluoroethylene (HFO-1123).

Mention may in particular be made, among hydrochlorofluoroolefins, of 1-chloro-3,3,3-trifluoropropene (HCFO-1233zd), in cis and/or transform, and preferably in trans form.

In certain embodiments, this refrigerant comprises at least 50% of HFO-1234yf, or at least 60% of HFO-1234yf, or at least 70% of HFO-1234yf, or at least 80% of HFO-1234yf, or at least 90% of HFO-1234yf, or at least 95% of HFO-1234yf, by weight.

In specific embodiments, the refrigerant consists essentially, indeed even consists, of HFO-1234yf and HFC-32. The content of HFO-1234yf is preferably from approximately 60% to approximately 95% by weight, more preferably from approximately 70% to approximately 90% by weight, more preferably from approximately 75% to approximately 85% by weight, more preferably of approximately 78.5% by weight; the content of HFC-32 is preferably from approximately 5% to approximately 40% by weight, more preferably from approximately 10% to approximately 30% by weight, more preferably from approximately 15% to approximately 25% by weight, and more preferably of approximately 21.5% by weight.

The additives which can be added to the refrigerant in order to form the heat-transfer composition can in particular be chosen from nanoparticles, stabilizing agents, surfactants, tracing agents, fluorescent agents, odorous agents and solubilizing agents.

The total amount of additives does not exceed 5% by weight, in particular 4%, more particularly 3% and very particularly 2% by weight, indeed even 1% by weight, of the refrigerant.

In certain embodiments, the HFO-1234yf contains impurities. When they are present, they can represent less than 1%, preferably less than 0.5%, preferably less than 0.1%, preferably less than 0.05% and preferably less than 0.01% (by weight), with respect to the HFO-1234yf.

One or more lubricants can be present in the heat-transfer composition. These lubricants can be chosen from polyol esters (POEs), polyalkylene glycols (PAGs) or polyvinyl ethers (PVEs).

The lubricants can represent from 1% to 50%, preferably from 2% to 40% and more preferably from 5% to 30% (by weight) of the heat-transfer composition.

Vapor Compression Circuit

The heating of the battery according to the invention is preferably carried out (at least partially) by means of an installation, which comprises a vapor compression circuit. The vapor compression circuit contains the above refrigerant, which provides heat transfer.

In certain embodiments, the vapor compression circuit is also suitable for cooling the battery of the vehicle.

In certain embodiments, the vapor compression circuit is also suitable for heating the passenger compartment of the vehicle.

In certain embodiments, the vapor compression circuit is also suitable for air conditioning (cooling) the passenger compartment of the vehicle.

For this purpose, the vapor compression circuit can comprise different branches provided with separate heat exchangers, the refrigerant circulating or not circulating in these branches, depending on the operating mode. Optionally, alternatively or in addition, the vapor compression circuit can comprise means for changing the direction of circulation of the refrigerant, comprising, for example, one or more three-way or four-way valves.

The main stages of the heat-transfer process are carried out cyclically and comprise:
the evaporation of the refrigerant in an evaporator;
the compression of the refrigerant in a compressor;
the condensation of the refrigerant in a condenser;
the expansion of the refrigerant in an expansion module.

The evaporation of the refrigerant can be carried out starting from a liquid phase or from a two-phase liquid/vapor mixture.

The compressor can be hermetic, semihermetic or open. Hermetic compressors comprise a motor part and a compression part which are confined within a nondismantlable hermetic enclosure. Semihermetic compressors comprise a motor part and a compression part which are directly assembled against each other. The coupling between the motor part and the compression part is accessible on separating the two parts by dismantling. Open compressors comprise a motor part and a compression part which are separate. They can operate by belt drive or by direct coupling.

Use may in particular be made, as compressor, of a dynamic compressor or a positive displacement compressor.

Dynamic compressors comprise axial compressors and centrifugal compressors, which can have one or more stages. Miniature centrifugal compressors can also be employed.

Positive displacement compressors comprise rotary compressors and reciprocating compressors.

Reciprocating compressors comprise diaphragm compressors and piston compressors.

Rotary compressors comprise screw compressors, lobe compressors, scroll (or spiral) compressors, liquid ring compressors and vane compressors. Screw compressors can preferably be twin-screw or single-screw.

The implementation of the invention is particularly advantageous when a scroll compressor is used because of its good efficiency under the typical conditions of a motor vehicle.

In the installation which is used, the compressor can comprise a device for injection of vapor or liquid. The injection consists in introducing refrigerant, in the liquid or vapor state, into the compressor at a level intermediate between the start and the end of compression.

In the installation which is used, the compressor can be driven by an electric motor or by a gas turbine (supplied, for example, by the exhaust gases of a vehicle) or by gearing.

The evaporator and the condenser are heat exchangers. Use may be made of any type of heat exchanger in the invention and in particular of cocurrent heat exchangers or, preferably, countercurrent heat exchangers.

The term "countercurrent heat exchanger" is understood to mean a heat exchanger in which heat is exchanged between a first fluid and a second fluid, the first fluid at the inlet of the exchanger exchanging heat with the second fluid at the outlet of the exchanger, and the first fluid at the outlet of the exchanger exchanging heat with the second fluid at the inlet of the exchanger.

For example, countercurrent heat exchangers comprise devices in which the flow of the first fluid and the flow of the second fluid are in opposite or virtually opposite directions. Exchangers operating in crosscurrent mode with a countercurrent tendency are also included among countercurrent heat exchangers.

The heat exchangers can in particular be exchangers having U-shaped tubes, a horizontal or vertical tube bundle, spirals, plates or fins.

The installation can also optionally comprise at least one heat-transfer fluid circuit used to transport heat (with or without change of state) between the circuit of the heat-transfer composition and the battery. Preferably, the installation does not comprise a heat-transfer fluid circuit used to transport heat between the heat-transfer composition circuit and the battery. It is also possible to provide for a heat exchanger of the circuit containing the heat-transfer composition to ensure an exchange of heat between the refrigerant and air, which is subsequently blown over the battery to ensure the exchange of heat with the battery itself. Preferably, however, a heat exchanger of the circuit containing the heat-transfer composition is in contact with the battery or incorporated in the battery.

The installation can also optionally comprise two (or more) vapor compression circuits containing identical or distinct heat-transfer compositions. For example, the vapor compression circuits can be coupled to one another. Preferably, however, the installation comprises a single vapor compression circuit.

According to the invention, the refrigerant can be superheated between the evaporation and the compression, that is to say that it can be brought to a temperature greater than the evaporation end temperature, between the evaporation and the compression.

The term "evaporation start temperature" is understood to mean the temperature of the refrigerant at the inlet of the evaporator.

The term "evaporation end temperature" is understood to mean the temperature of the refrigerant during the evaporation of the last drop of refrigerant in liquid form (saturated vapor temperature or dew point).

When the refrigerant is HFO-1234yf, alone or an azeotropic mixture containing HFO-1234yf, the evaporation start temperature is equal to the evaporation end temperature at constant pressure.

The term "superheating" (equivalent here to "superheating at the evaporator") denotes the temperature differential between the maximum temperature reached by the refrigerant before the compression (that is to say, the maximum temperature reached by the refrigerant on conclusion of the superheating stage) and the evaporation end temperature. This maximum temperature is generally the temperature of the refrigerant at the inlet of the compressor. It can correspond to the temperature of the refrigerant at the outlet of the evaporator. Alternatively, the refrigerant can be at least partially superheated between the evaporator and the compressor (for example by means of an internal exchanger). The superheating can be adjusted by appropriate regulation of the parameters of the installation and in particular by regulation of the expansion module.

In the process of the invention, the superheating can be from 1 to 25° C., preferably from 2 to 10° C., preferably from 3 to 7° C. and more preferably from 4 to 6° C.

According to the invention, the refrigerant can be subcooled between the condensation and the expansion, that is to say that it can be brought to a temperature lower than the condensation end temperature, between the condensation and the expansion.

The term "condensation start temperature" is understood to mean the temperature of the refrigerant in the condenser during the appearance of the first liquid drop of refrigerant, referred to as vapor saturation temperature or dew point.

The term "condensation end temperature" is understood to mean the temperature of the refrigerant during the condensation of the last bubble of refrigerant in gaseous form, referred to as liquid saturation temperature or bubble point.

The term "subcooling" (equivalent here to "subcooling at the condenser") denotes the possible temperature differential (in absolute value) between the minimum temperature reached by the refrigerant before the expansion (that is to say, the minimum temperature reached by the refrigerant on conclusion of the subcooling stage) and the condensation end temperature. This minimum temperature is generally the temperature of the refrigerant at the inlet of the expansion module. It can correspond to the temperature of the refrigerant at the outlet of the condenser. Alternatively, the refrigerant can be at least partially subcooled between the condenser and the expansion module (for example by means of an internal exchanger).

In the process of the invention, the subcooling, when it is present, can be from 1 to 50° C., preferably from 1 to 40° C., preferably from 1 to 30° C., preferably from 1 to 20° C., preferably from 1 to 15° C., preferably from 1 to 10° C. and more preferably from 1 to 5° C.

The expansion module can be a thermostatic valve referred to as thermostatic expansion valve or electronic expansion valve having one or more orifices, or a pressostatic expansion valve which regulates the pressure. It can also be a capillary tube, in which the expansion of the fluid is obtained by the pressure drop in the tube.

Use of the Refrigerant

The invention relates to the use of a refrigerant comprising HFO-1234yf for the heating of the above battery.

The term "temperature of the battery" is generally understood to mean the temperature of an exterior wall of one or more of its electrochemical cells.

The temperature of the battery can be measured by means of a temperature sensor. If several temperature sensors are present at the battery, the temperature of the battery can be regarded as being the mean of the different temperatures measured.

The above heating can be carried out when the battery of the vehicle is charging. Alternatively, it can be carried out when the battery is discharging, in particular when the engine of the vehicle is started. It makes it possible to prevent the temperature of the battery from being too low due to the exterior temperature.

In certain embodiments, the heating in question makes it possible to raise the temperature of the battery by at least 5° C., or by at least 10° C., or by at least 15° C., or by at least 20° C., or by at least 25° C. or by at least 30° C.

In certain embodiments, the exterior temperature during the heating of the battery is less than or equal to 5° C., preferably less than or equal to 0° C., more preferably less than or equal to −10° C., more preferably less than or equal to −15° C., more preferably less than or equal to −20° C.

The term "exterior temperature" is understood to mean the ambient temperature outside the vehicle.

In certain embodiments, an electrical resistance contributes partially to the heating of the battery, either at different moments with respect to the heating by the vapor compression circuit, or simultaneously.

In other embodiments, only the vapor compression circuit is responsible for the heating of the battery.

In certain embodiments, the heating of the battery is continuous over a certain period of time.

In certain embodiments, the heating of the battery alternates with periods of interruption, indeed even with periods in which the battery is cooled. When the battery is cooled, it can be cooled in particular by means of the vapor compression circuit described above.

In certain embodiments, the heating and optionally the cooling make it possible to maintain the temperature of the battery within an optimum temperature range, in particular when the vehicle is in operation (engine on) and especially when the vehicle is moving. This is because, if the temperature of the battery is too high, its performance is liable to decrease and the battery to degrade.

In certain embodiments, the temperature of the battery of the vehicle is thus maintained between a minimum temperature $t_1$ and a maximum temperature $t_2$.

In certain embodiments, the minimum temperature $t_1$ is greater than or equal to 10° C. and the maximum temperature $t_2$ is less than or equal to 40° C., preferably the minimum temperature $t_1$ is greater than or equal to 15° C. and the maximum temperature $t_2$ is less than or equal to 30° C., and more preferably the minimum temperature $t_1$ is greater than or equal to 16° C. and the maximum temperature $t_2$ is less than or equal to 28° C.

A feedback loop is advantageously present, in order to modify the operating parameters of the installation as a function of the temperature of the battery which is measured, in order to ensure that the desired temperature is maintained.

The invention claimed is:

1. A use of a refrigerant comprising 2,3,3,3-tetrafluoropropene for heating of a battery of an electric vehicle comprising at least one electrochemical cell comprising a negative electrode, a positive electrode and an electrolyte, the electrolyte comprising a lithium salt and the negative electrode comprising metallic lithium as electrochemically active material,
   wherein the refrigerant comprises 60% by weight to 78.5% by weight of 2,3,3,3-tetrafluoropropene and 21.5% by weight to 40% by weight of difluoromethane, and
   wherein the refrigerant circulates in a vapor compression circuit such that a heat-transfer process of the refrigerant is carried out cyclically and comprises:
   evaporation of the refrigerant in an evaporator;
   compression of the refrigerant in a compressor;
   condensation of the refrigerant in a condenser; and
   expansion of the refrigerant in an expansion module,
   wherein the refrigerant is subcooled between the condensation and the expansion, and the subcooling is from 1 to 50° C.

2. The use as claimed in claim 1, in which the lithium salt of the electrolyte is chosen from $LiPF_6$, LiFSI, LiTDI, $LiPOF_2$, $LiB(C_2O_4)_2$, $LiF_2B(C_2O_4)_2$, $LiBF_4$, $LiNO_3$, $LiClO_4$ and the mixtures of these.

3. The use as claimed in claim 1, in which the battery is maintained at a temperature of between a minimum temperature $t_1$ and a maximum temperature $t_2$, in which the minimum temperature $t_1$ is greater than or equal to 10° C. and the maximum temperature $t_2$ is less than or equal to 40° C.

4. The use as claimed in claim 1, in which the vapor compression circuit is also suitable for heating the passenger compartment of the vehicle and/or for air conditioning the passenger compartment of the vehicle and/or for cooling the battery of the vehicle.

5. The use as claimed in claim 1, in which the refrigerant comprises 78.5% by weight of 2,3,3,3-tetrafluoropropene and 21.5% by weight of difluoromethane.

6. A process for conditioning the battery of an electric vehicle, said battery comprising at least one electrochemical cell comprising a negative electrode, a positive electrode and an electrolyte, the electrolyte comprising a lithium salt and the negative electrode comprising graphite or a lithium-containing material as electrochemically active material, the process comprising:
heating of the battery with a refrigerant comprising 60% by weight to 78.5% by weight of 2,3,3,3-tetrafluoropropene and 21.5% by weight to 40% by weight of difluoromethane; and
circulating the refrigerant in a vapor compression circuit such that a heat-transfer process of the refrigerant is carried out cyclically and comprises:
evaporation of the refrigerant in an evaporator;
compression of the refrigerant in a compressor;
condensation of the refrigerant in a condenser; and
expansion of the refrigerant in an expansion module, wherein the refrigerant is subcooled between the condensation and the expansion, and the subcooling is from 1 to 50° C.

7. The process as claimed in claim 6, in which the lithium salt of the electrolyte is chosen from $LiPF_6$, LiFSI, LiTDI, $LiPOF_2$, $LiB(C_2O_4)_2$, $LiF_2B(C_2O_4)_2$, $LiBF_4$, $LiNO_3$, $LiClO_4$ and the mixtures of these.

8. The process as claimed in claim 6, comprising:
maintaining the battery of the vehicle at a temperature of between a minimum temperature $t_1$ and a maximum temperature $t_2$, in which the minimum temperature $t_1$ is greater than or equal to 10° C. and the maximum temperature $t_2$ is less than or equal to 40° C.

9. The process as claimed in claim 8, in which maintaining the battery of the vehicle at a temperature of between $t_1$ and $t_2$ is carried out alternately by cooling the battery with the refrigerant and by heating the battery.

10. The process claim 9, in which the heating of the battery is also carried out partially by an electrical resistance.

11. The process as claimed in claim 6, in which the refrigerant comprises 78.5% by weight of 2,3,3,3-tetrafluoropropene and 21.5% by weight of difluoromethane.

* * * * *